April 12, 1932.   S. H. NORTON   1,853,635

FASTENER

Filed July 12, 1930

INVENTOR.
Samuel H. Norton.
BY R. S. Kelley
ATTORNEY.

Patented Apr. 12, 1932

1,853,635

UNITED STATES PATENT OFFICE

SAMUEL H. NORTON, OF MEADVILLE, PENNSYLVANIA, ASSIGNOR TO HOOKLESS FASTENER COMPANY, A CORPORATION OF PENNSYLVANIA

FASTENER

Application filed July 12, 1930. Serial No. 467,458.

My invention relates to fasteners and particularly to fasteners of the type having fastener elements mounted on flexible fabric tapes or stringers.

The general object of the invention is to provide a fastener of this type having an improved tape or stringer construction.

In the manufacture of slide fasteners, the fastener elements are attached to the edges of the flexible fabric tapes of the proper length and the fastener is applied to the article to be fastened by sewing or otherwise securing the tapes to the edges of the article.

It is now the practice to provide a considerable length of tape extending beyond the metal fastener elements and end stop members in order to insure that fraying of the ends of the tapes will not allow displacement of the stop members relative to the fastener elements. On the average the tape length is made about three inches greater than the metal length. Another reason for providing this unused length of tape is to make the tapes adjacent the end portions of the fastener hold their shape, and also to maintain a secure connection between the tape and the cords which are attached along one edge of each tape to form a beaded edge to which the jaws of the fastener and stop elements are clamped.

In applying the fastener to the article rigid instructions are always given not to cut off the ends of these tapes close to the fastener elements but to turn the ends of the tapes under and sew them into the article without cutting off. In some instances, it is difficult to secure a neat application of the fastener due to the necessity of turning these ends under.

This invention purposes therefore to provide an improved tape construction whereby tapes can be cut off close to the stop members of such a fastener thus resulting in a considerable saving of fabric materials and also making possible a less difficult and neater application of the fastener in many articles.

In carrying out my invention, the fastener elements and stop members are attached to the tapes and the tapes trimmed off very close to the stop members. The cut-off ends are then stiffened in any suitable manner at the ends to prevent fraying of the fabric and to make the ends of the tapes hold their shape. I have discovered that these ends may be very easily stiffened by dipping them into a solution of stiffening material, a good example of which is collodion. Any suitable material may of course be used, and any solution of fossil or synthetic gums will serve the purpose very well. The composition of such materials is, of course, well known and most of them having as an essential ingredient a solution of alcohol, ether and guncotton. By cutting off the tape ends and dipping them into a viscous solution of this nature, and allowing them to dry, the solvents escape into the atmosphere and the material stiffens or hardens. The result is a stiff edge on the end of each tape which cements the threads of the fabric together and prevents them from fraying and at the same time, holds this portion of the tape in its original shape and maintains the connection between the cords and the tape just as secure as a long extension on the tape.

Other objects and advantages of the invention will more fully appear from the foregoing and from the detailed description to follow.

In the accompanying drawings, I have shown for purposes of illustration, one embodiment which my invention may assume in practice. In these drawings.

Figure 1:
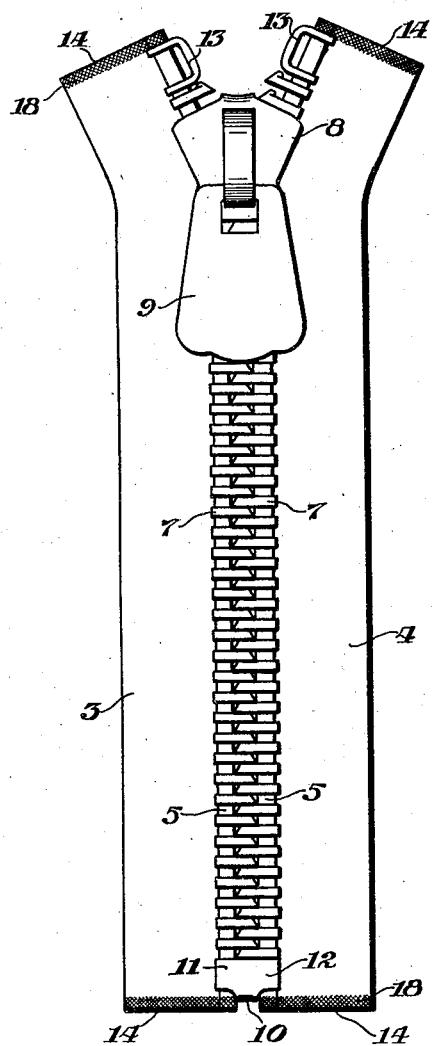
Fig. 1 represents a plan view of a slide fastener embodying my invention.

The fastener with which I have illustrated my invention, comprises a pair of fabric tapes 3 and 4 which vary in width according to the article in which it is desired to apply the fastener. A pair of cords 5 are attached along opposite edges of each of the tapes by stitching 6, and a series of fastener elements 7 is mounted on each of the stringers by suitable clamping portions which engage around the cords 5. The specific construction of these fastener elements does not form any part of the present invention and accordingly will not be described in detail. It is sufficient to state that the fastener is of a well known commercial construction, an early example of which is disclosed in the patent to Gideon Sundback No. 1,219,881, March 20, 1917. The fastener elements on the respective stringers are engaged and released by the movement of a slider 8 which is conveniently actuated by a pull 9, attached thereto. In order to hold the fastener elements together at their lower ends and to maintain them in proper longitudinal alinement so that the fastener elements will always mesh properly, a stop member 10 having clamping portions 11 and 12 attached to the corded edges of the stringers adjacent the ends of the series of fastener elements, is provided. In other types of fasteners, the stringers are arranged to be completely separated and a suitable connecting device substituted in the place of a permanent connecting member and stop 10 and it will be of course understood that my invention is equally applicable to either type of construction. In order to prevent the slider from being pulled off the stringers at their other ends, U-shaped stop elements 12 and 13 are clamped on the edges of the respective stringers adjacent the endmost interlocking element on its stringer and these stop members are designed to abut against each other inside the slider and limit its movement.

Figure 2:
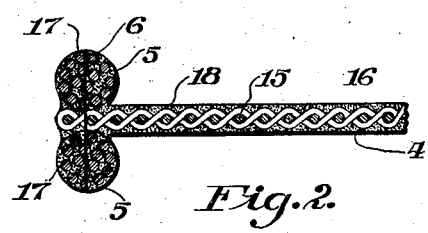
Fig. 2 is a sectional view of the end of one of the tapes treated according to my invention.

It will be observed that the ends of each of the tapes are cut off square to form the edges 14 extending substantially at right angles to the length of the tapes. A cross-section through one of the tapes shown in Fig. 2, illustrates a woven construction having longitudinally extending filler threads 15 and crosswise threads 16 and of course the construction of the textile material may vary largely depending on the service to which it may be subjected. The cords 5 are constructed of a bundle of twisted threads 17. It is not necessary to provide a very substantial length of tape beyond the stop elements 10 at one end and 13 at the other end and in practice, anything from three-eighths of an inch down to one thirty-second of an inch may be used. However, in most instances, it will be found desirable to provide an extension of about one-eighth or three-sixteenths of an inch beyond the stop elements. The ends of the tapes are next dipped into the solution of stiffening material which, as already mentioned, may be collodion. The material impregnates more or less the interstices between the threads of the fabric and forms a coating of stiffening material 18.

As a result of my invention, it will be observed that the aforementioned objects have all been accomplished in a satisfactory manner without adding to the cost of fastener production. In fact it is believed that the expense of the stiffening operation may be materially less than the saving in material which will result due to the elimination of the excessive lengths of tape at the ends of the fastener. At the same time, a fastener which is very neat in appearance is produced and one which can be readily attached in almost any article.

While I have in this application specifically described one embodiment which my invention may assume in practice, it will be understood that this embodiment is merely for the purposes of illustration and description and that various other forms may be devised within the scope of my invention as defined in the appended claims.

What I claim as my invention is:

1. In a fastener, a pair of flexible fabric tapes, fastener elements mounted on said tapes, and stop members on said tapes arranged at the ends of the series of fastener elements, said tapes being cut off close to said stop members, and the cut-off ends being treated with a solution of stiffening material to prevent fraying of the ends.

2. In a fastener, a pair of flexible fabric tapes, a series of fastener elements mounted on the edge of each tape, and stop members mounted on the tapes at the ends of said series of fastener elements, said tapes being cut off square within one quarter inch of said stop members, the end portions of the tape being dipped in a solution of stiffening material and dried, to prevent fraying of the tape ends and to maintain said stop members in proper position.

3. In a fastener, a pair of flexible fabric tapes, a series of fastener elements mounted on each of said tapes, and stop members on the stringers at the ends of the series of fastener elements, said tapes being cut off within one quarter inch of said stop members, the cut-off ends being dipped into a solution of collodion and dried to stiffen the ends and prevent displacement of the stop members.

4. In a fastener, a pair of flexible fabric tapes, metal elements attached in closely spaced relation along the edges of said tapes, a slider movable over said elements to open and close the fastener, at least one end of each of said tapes being cut off to leave a length of tape projecting beyond the metal elements of from one thirty-second to three-eighths of an inch, the projecting ends of said tapes being impregnated with a suitable stiffening material.

5. In a fastener, a pair of flexible fabric tapes, metal elements attached in closely spaced relation along the edges of said tapes, a slider movable over said elements to open and close the fastener, both ends of each stringer being cut off squarely across the tape to leave a length of tape projecting beyond the metal elements of from one thirty-second to three-eighths of an inch, the ends of said tapes being treated with a suitable sizing and stiffening material to prevent the endmost elements from becoming detached from the stringers.

In testimony whereof I affix my signature.

SAMUEL H. NORTON.